United States Patent

[11] 3,544,065

| [72] | Inventor | Jacques H. Mercier<br>49 rue de Naples, Paris, France |
|---|---|---|
| [21] | Appl. No. | 814,539 |
| [22] | Filed | April 9, 1969<br>Continuation-in-part of Ser. No. 734,388,<br>June 4, 1968, pending. |
| [45] | Patented | Dec. 1, 1970 |
| [32] | Priority | May 6, 1968 |
| [33] | | France |
| [31] | | No. 150,619 |

[54] RESILIENT ANNULAR VALVE SEAT WITH COAXIAL RIGID ANNULAR MEMBER
4 Claims, 3 Drawing Figs.

[52] U.S. Cl. .................................................. 251/284,
251/333, 251/361, 251/321
[51] Int. Cl. .................................................. F16k 1/34
[50] Field of Search .......................................... 251/361,
362, 358, 333, 363, 321, 284

[56] References Cited
UNITED STATES PATENTS

| 2,662,348 | 12/1953 | Jacobsson | 251/362X |
| 2,745,432 | 5/1956 | Williams | 251/333X |
| 2,868,497 | 1/1959 | Graham | 251/363X |
| 3,022,978 | 2/1962 | Kowalski | 251/363X |
| 3,358,964 | 12/1967 | Cohen et al. | 251/361X |

*Primary Examiner*—Arnold Rosenthal
*Attorney*—Arthur B. Colvin

ABSTRACT: This invention relates to a valve for fluid under pressure, said valve comprising a fluid passageway having a resilient annular seat encompassing the passageway with a valve member cooperating with said seat to control said passageway, said valve member being urged to closed position against said seat both by the fluid pressure and by associated resilient means, said valve member including a stem, the end of which is designed to be pushed to open the valve, said resilient annular seat having a rigid annular member coaxial therewith.

Patented Dec. 1, 1970
3,544,065
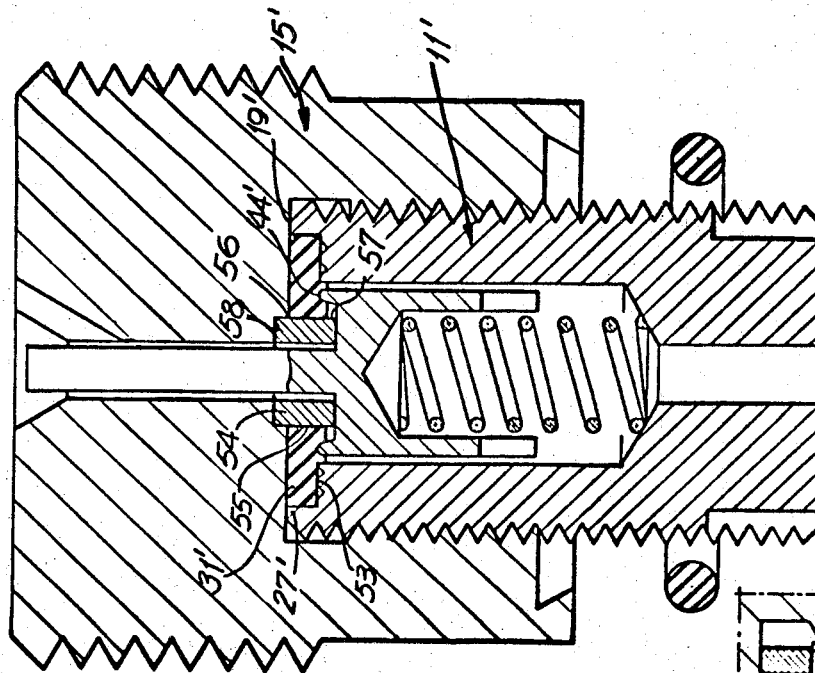
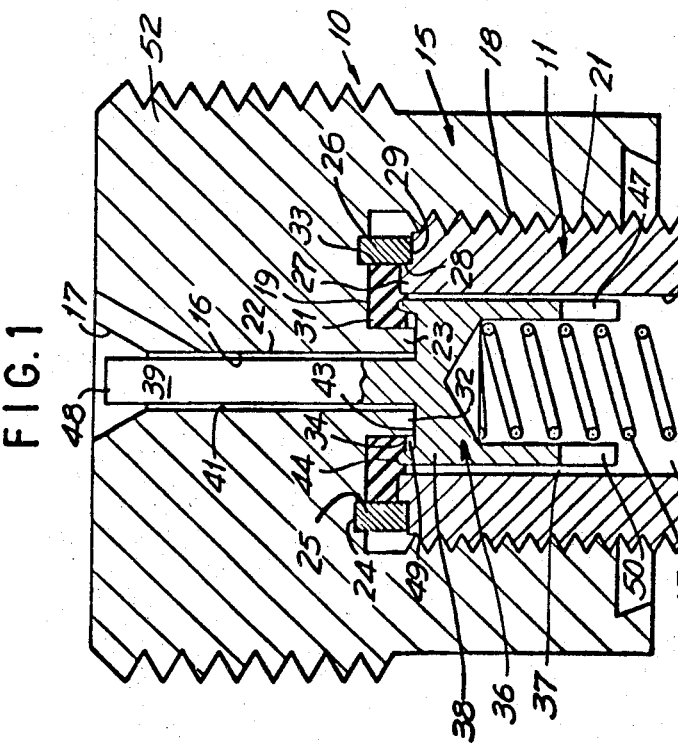
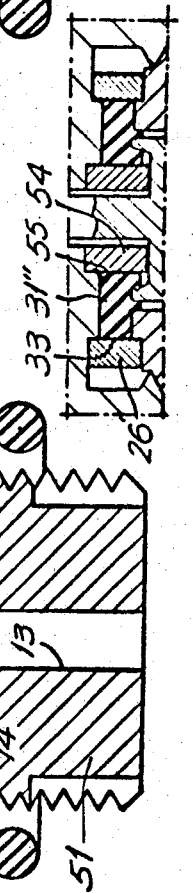
INVENTOR
JACQUES H. MERCIER
By
Mot B Cohen
ATTORNEY

RESILIENT ANNULAR VALVE SEAT WITH COAXIAL RIGID ANNULAR MEMBER

As conducive to an understanding of the invention, it is noted that where a pressure vessel is used in systems in which the pressure varies over a wide range, it is essential that the charging valve incorporated into the pressure vessel be capable of providing a dependable seal throughout such range of pressures.

Where the charging valve is of the type comprising a fluid passageway having a resilient annular seat encompassing the passageway, which annular seat is retained in fixed position by the abutment of two rigid parts which are screwed together for example, and a valve member has an outstanding annular rim which is moved against the annular seat to seal the passageway, if the transverse abutting surfaces of said rigid parts are not exactly perpendicular to the axis of the valve, when the rigid parts are screwed together, they may move laterally thereby deforming the resilient member retained therebetween and preventing proper sealing action.

It is accordingly among the objects of the invention to provide a charging valve that is simple in construction and has but few parts that may be readily fabricated at low cost, which may readily be assembled without likelihood of improper deformation or off center movement of the sealing member of the valve and which will be effective to prevent leakage over a wide pressure range.

According to the invention, these objects are accomplished by the arrangement and combination of elements hereinafter described and more particularly recited in the claims.

In the accompanying drawings in which are shown one or more of various possible embodiments of the several features of the invention.

FIG. 1 is a longitudinal sectional view of a valve according to one embodiment of the invention;

FIG. 2 is a view similar to FIG. 1 of another embodiment of the invention, and

FIG. 3 is a fragmentary detail sectional view of still another embodiment of the invention.

Referring now to the drawings, as shown in FIG. 1, the valve 10 comprises a base portion 11 having an axial bore therethrough of enlarged diameter at one end as at 12 defining a cylindrical cavity and of reduced diameter at its other end as at 13, the junction between said portions 12 and 13 defining a conical seating surface 14 which tapers outwardly from the reduced diameter portion 13.

The valve 10 also includes a cap 15 which has an axial bore 16 therethrough with a conical recess 17 at its outer end. The bore 16 has an enlarged diameter portion 18 defining an annular shoulder 19 and is internally threaded as at 21 to receive the correspondingly threaded outer periphery of base portion 11. The inner end of the small diameter portion 22 of bore 16 has a cylindrical boss 23 which projects from the annular shoulder 19, said annular shoulder 19 having an annular groove 24 in which is seated the end 25 of a rigid washer 26. As shown in FIG. 1, the inner end 27 of base portion 11 has an annular recess 28 adjacent its outer periphery defining an annular shoulder 29, designed to abut against the adjacent end of the washer 26 when the parts 11 and 15 are screwed together, securely to retain said washer 26 in annular groove 24.

Positioned on the end 27 of base 11 is the outer periphery of a washer 31 of resilient material, said washer defining a resilient seat.

As shown in FIG. 1, the washer 31 encompasses the cylindrical boss 23, the end 32 of which protrudes beyond the washer. The outer periphery of the washer is securely clamped between the end 27 of base 11 and the annular shoulder 19, the resilient washer 31 being retained between the cylindrical boss 23 and the rigid washer 26, the latter preventing undue compression of the outer periphery of the resilient washer 31 when the parts 11 and 15 are screwed together.

Preferably, the rigid washer 26 which encompasses resilient washer 15 is preassembled with the latter, being adhesively bonded thereto as at 33, this preassembly facilitating installation into the unit.

The rigid washer 26 is preferably secured to the resilient washer 31 so that the latter is symmetrically located between the ends of the rigid washer 26 which is of greater thickness than the resilient washer, so as to permit installation of the resultant assembly regardless of which side of the assembly is topmost.

The washer 31, which may be of rubber or similar material, is normally of thickness slightly greater than the distance between opposed surfaces 19 and 27 and less than the length of the cylindrical boss 23. With the washer 31 mounted as above described, the portion of the inner surface of the washer extending inwardly of the end 27 of base member 11, will present an uncovered annular sealing zone 34 which extends between the cylindrical boss 23 and the cylindrical wall of bore portion 12 adjacent the inner edge of end 27 to define a valve seat.

Positioned in the enlarged diameter portion 12 is a cylindrical cup-shaped valve member 36, the outer surface of which is considerably spaced from the wall surface of portion 12 as at 37.

The end wall or floor 38 of the cup-shaped valve member has an axial stem 39 extending therefrom through the bore 16 of cap 15. The stem 39 is of much smaller diameter than bore 16 to define a fluid passageway 41 therebetween.

The outer surface 43 of the floor 38 of valve member 36 has a peripheral rim 44 which is normally urged against the sealing portion 34 of resilient washer 31 by means of a coil spring 45 positioned in the recess 46 of the cup-shaped valve member and reacting against the seating surface 14.

The end of the wall of the cup-shaped valve member 36 has a plurality of notches 47 therethrough defining passageways.

Since the valve member 36 is essentially floating, there is no problem of alinement and an effective seal will be provided so long as the annular rim 44 engages washer 31. The abutment of the outer surface 43 of the floor of the valve member against the end 32 of the cylindrical boss 23 will prevent cutting of the washer 31 by the rim 44.

Since the resilient washer 31 is bonded at 33 to the rigid washer 26, and since the relative rotary movement created by the screwing together of the parts 11, 15 will, in the first instance, react against the rigid washer 26, opposed ends of which may readily be machined or otherwise formed, to be parallel, slippage of the resilient washer 31 both during installation and during use of the valve under high pressure is precluded.

It is to be noted that the end 48 of the stem 39 extends into the conical recess 17 when the valve member is in closed position, as shown in FIG. 1.

It is to be further noted that the clearances 37 and 41 and the reduced diameter portion 13 form a passageway for the fluid charged through the inlet 27. This passageway is normally closed as at 49 when the annular rim 44 is urged against the surface 34 of the washer 31 by both the force of spring 45 and the fluid pressure in the pressure vessel (not shown) into which the lower end 51 of the base portion 11 is screwed. The passageway is open when the annular rim 44 is moved away from the sealing portion 34 of washer 31 when the stem is moved inwardly in the manner now to be described.

To effect opening of the valve in order to charge or discharge the pressure vessel, as the case may be, a conventional fitting (not shown) may be screwed on the threaded upper end 52 of cap 15, the fitting having an axial protrusion which acts against the end 48 of stem 39 to move the latter inwardly. Such movement will move the annular rim 44 of the valve member 36 away from its seat 34 to provide communication between reduced portion 13 and the fitting (not shown) connected to the upper end 52 of cap 15.

In the event that when the valve member 36 is moved to open position, a sudden rush of fluid under pressure should cause the valve member 36 to move away from its seat rapidly, by reason of the fact that the rim 50 of the valve member would abut against the surface 14, excessive compression of coil spring 45 would be prevented to insure long life of said coil spring.

The embodiment shown in FIG. 2 is similar to the embodiment shown in FIG. 1 and corresponding parts have the same reference numerals primed.

In the embodiment shown in FIG. 2 the end 27' of base 11' has an annular recess 53 formed in its inner periphery on which the outer periphery of resilient washer 31' may be positioned. In this embodiment the rigid washer 26 shown in FIG. 1 is eliminated and a rigid washer 54 is provided which is encompassed by the resilient washer 31' being adhesively bonded thereto as at 55. The washer 54 like the washer 26 has a height greater than that of the resilient washer 31' and presents two protruding cylindrical end portions 56 and 57, the portion 56 being centered in an annular recess 58 in cap 15'.

With the above construction, excessive compression of the resilient washer 31', when parts 11' and 15' are screwed together, is limited by the abutment of the end 27' of base 11 against the surface 19' of cap 15'.

The washer 54 will limit the movement of the rib 44' into the resilient washer 31' and by reason of the retention of the resilient washer 31' to the rigid washer 54 as at 55, high pressures in the valve will not affect displacement of the resilient washer 31'.

The embodiment shown in FIG. 3 combines features of both of the embodiments of FIGS. 1 and 2. Thus, two rigid washers 26 and 54 are provided, the resilient washer 31'' being bonded to said rigid washers as at 33 and 55.

Since the operation of the embodiment shown in FIGS. 2 and 3 is similar to the embodiment shown in FIG. 1, they will not be described.

The valve above described has relatively few parts which readily may be manufactured by simple machining operations in most cases. By reason of the fact that the valve may be quickly disassembled, the resilient washer 31 may readily be removed for replacement, such replacement being facilitated by reason of the fact that the rigid washer or washers associated with the resilient washer are bonded thereto. Since the washer 31 is firmly held in position during assembly and in operation, and is mounted so that it cannot be crushed or cut during assembly and since it is not in the flow path of the fluid, it will have relatively long life.

The valves, according to the invention, can withstand relatively high pressures due to the fact that there is a rigid abutment of the surface 43 of the valve member against the end 32 of the cylindrical boss 23 as shown in FIG. 1 or against the end 57 of the rigid washer 54, shown in FIG. 2.

Furthermore, the valve member will dependably remain in closed position due not only to the action of the coil spring 45, but also to the effect of the fluid under pressure reacting thereagainst.

I claim:

1. A valve for controlling flow of fluid under pressure, said valve comprising a pair of relatively movable engaging parts having a passageway therethrough for such fluid, an annular washer of resilient material coaxial with said passageway and defining a valve seat, an annular washer of rigid material coaxial with said first washer, said washers having adjacent abutting peripheral surfaces, an additional annular washer of rigid material coaxial with said resilient annular washer, one of said rigid washers being encompassed by said resilient washer and the other of said rigid washers encompassing said resilient washer, a valve member associated with said seat and movable thereagainst to stop flow through said passageway, resilient means reacting against said valve member normally to retain the latter against said seat, said valve member having an axial stem extending through said passageway and movable in direction opposed to the direction of the force exerted by said resilient means to move the valve member away from said seat.

2. A valve for controlling flow of fluid under pressure, said valve comprising a pair of relatively movable engaging parts having a passageway therethrough for such fluid, an annular washer of resilient material coaxial with said passageway and defining a valve seat, an annular washer of rigid material coaxial with said first washer, said washers having adjacent abutting peripheral surfaces, said rigid annular washer being encompassed by said resilient washer, the latter extending radially outward from said rigid washer and being interposed between said pair of relatively movable parts to be clamped therebetween, said pair of parts having engaging surfaces to limit said clamping action, a valve member associated with said seat and movable thereagainst to stop flow through said passageway, resilient means reacting against said valve member normally to retain the latter against said seat, said rigid washer limiting the movement of said valve member against said valve seat, said valve member having an axial stem extending through said passageway and movable in direction opposed to the direction of the force exerted by said resilient means to move the valve member away from said seat.

3. A valve for controlling flow of fluid under pressure, said valve comprising a pair of relatively movable engaging parts having a passageway therethrough for such fluid, an annular washer of resilient material coaxial with said passageway and defining a vale seat, an annular washer of rigid material coaxial with said first washer, said washers having adjacent abutting peripheral surfaces, an additional annular washer of rigid material coaxial with said resilient annular washer, one of said rigid washers encompassing said resilient washer and the other of said rigid washers being encompassed by said resilient washer, said encompassing washer being clamped between said pair of relatively movable parts, said resilient washer extending radially inward from said encompassing washer and being interposed between said parts, said encompassing washer limiting compression of said interposed portion of said resilient washer by said parts, a valve member associated with said seat and movable thereagainst to stop flow through said passageway, resilient means reacting against said valve member normally to retain the latter against said seat, said encompassed rigid washer limiting movement of said valve member against said vale seat, said valve member having an axial stem extending through said passageway and movable in direction opposed to the direction of the force exerted by said resilient means to move the valve member away from said seat.

4. The combination set forth in claim 3 in which said rigid annular washers are of thickness greater than that of the resilient annular washer, and said resilient annular washer is bonded to said rigid washers midway between opposed ends of each of said rigid washers.